United States Patent [19]

Thoman et al.

[11] Patent Number: 5,020,564
[45] Date of Patent: Jun. 4, 1991

[54] DOSER SYSTEM FOR REGULATING PRESSURE IN A CONTROL CHAMBER OF A TEST STAND

[75] Inventors: David C. Thoman, Mishawaka; Marvin N. Briggs; James M. Eastman, both of South Bend, all of Ind.

[73] Assignee: Allied-Signal Inc., Morristown, N.J.

[21] Appl. No.: 545,689

[22] Filed: Jul. 2, 1990

Related U.S. Application Data

[63] Continuation of Ser. No. 374,040, Jun. 29, 1989, abandoned.

[51] Int. Cl.⁵ .............................................. G05D 16/20
[52] U.S. Cl. .................................. 137/102; 137/487.5; 251/129.05
[58] Field of Search ................... 137/487.5, 486, 102; 251/129.05

[56] References Cited

U.S. PATENT DOCUMENTS 3,874,407  4/1975  Griswold ................ 251/129.05 X
4,253,480  3/1981  Kessel ..................... 137/487.5 X
4,638,837  1/1987  Buike ..................... 251/129.05 X
4,766,921  8/1988  Williams ................ 251/129.05 X Primary Examiner—Alan Cohan
Attorney, Agent, or Firm—Leo H. McCormick, Jr.; Ken C. Decker

[57] ABSTRACT

A test stand having a control chamber with a fluid pressure therein for simulating an operational parameter of a device. A doser system with a controller which receives an input representing a desired pressure Px in the control chamber. The controller supplies either a first or second solenoid valve with an actuation signal to allow fluid pressure from a source to enter the control chamber or fluid from the control chamber to flow to the surrounding environment to change the fluid pressure in the control chamber form Pc to Pc'. A pressure transducer supplies the controller with a feedback signal corresponding to the actual fluid pressure Pc' in the control chamber. The controller derives an error signal (Px-Pc') to define an update for the actuation signal. As Pc' approaches Px, the duration of the actuation signal correspondingly changes to assure that the desired fluid pressure for the control chamber is achieved without exceeding the desired fluid pressure in a relatively short time period.

1 Claim, 3 Drawing Sheets

DOSER SYSTEM FOR REGULATING PRESSURE IN A CONTROL CHAMBER OF A TEST STAND

This is a continuation of application Ser. No. 374,040 filed June 29, 1989, now abandoned.

This invention relates to a pressure regulator for a test stand to accurately establish a desired fluid pressure in a control chamber and simulate an operational parameter for a device that is under test.

Stepping motors have long been used to provide extremely accurate speed and particularly position control for various devices. Within the limits of system dynamics, a stepping motor increments one step each time a pulse controlled change of polarity is applied to its windings. The steps are typically 1/200 or 1/400 of a revolution per step and such low angular increments coupled with a low pitch lead screw can result in a position change of a driven element as low as 0.0001 inches per step. Driving a stepping motor at steady state is not difficult and requires only an oscillator with the desired frequency. A typically control circuit for a servomotor is disclosed, U.S. Pat. No. 4,248,301, wherein the rotation of a shaft is progressively reduced as the motor shaft approaches a desired position.

In test stands it is common practice to use a stepper motor which responds to electrical signals to control the creation of a desired fluid pressure in various control chambers. The electronic signals are developed in an electronic controller as a result of inputs supplied from a rotational to translational conversion mechanism, a pressure regulator and a feedback pressure transducer. In such a system, the pressure control range is limited by the range of the pressure regulator while the speed of response is limited by the maximum stepping rate of the stepping motor. Unfortunately, in evaluating the operation of a device under certain test conditions there may be a delay in establishing desired parameters within certain time limits.

In the present test system, the stepping motor has been eliminated and replaced with a pair of solenoid valves which respond to a control mode of a controller to control the development of an operational fluid pressure in a control chamber. In addition the solenoid valves have eliminated the need for a rotation to translation conversion mechanism associated with a stepper motor and as a result the cost of the test system for establishing a desired fluid pressure in a control chamber to simulate a desired operational parameter for a devices under consideration has been substantially reduced.

An advantage the present invention has over the current test systems is through the use of a pair of solenoids to control the establishment of a desired fluid pressure which has substantially reduced the time and increased the accuracy in establishing a desired fluid pressure to simulate an operational parameter for a device under test or evaluation.

In the invention disclosed herein, the test system includes a pair of normally closed solenoid valves which control the creation and retention of fluid pressure in a control chamber. In response to an operational signal from a controller one of the solenoid valves is actuated. Actuation of the first solenoid valve allows high pressure fluid to flow from a source into the control chamber causing the chamber fluid pressure to increase from Pc to Pc'. Similarly, actuation of the second solenoid valve vents fluid from the control chamber causing the chamber fluid pressure to decrease from Pc to Pc". A pressure transducer in the control chamber detects the actual fluid pressure in the control chamber and supplies the controller with a feedback signal $P_f$. The controller computes an error signal from the desired fluid pressure represented by the operational signal and actual fluid pressure represented by the feedback signal to define which solenoid valve to actuate. The error signal is developed at set sampling intervals to allow the controller to sequentially vary the duration of the electrical pulses to the solenoid valves as the pressure in the control chamber approaches the desired fluid pressure requested by an operator input.

In operation of the test system, the desired actual fluid pressure in a control chamber was achieved within 0.3 psi within 5 seconds when a supply pressure of 300 psi was available. These test conditions approach the operational parameters experienced by a device under actual operating conditions.

It is an object of this invention to provide a test stand with a doser system to control the development of a fluid pressure in a control chamber and thereby simulate actual operational parameters for a device under test.

An advantage of the doser system disclosed in this invention occurs through the use of a pair of solenoid valves which respond to an operational signal derived from an error signal computed from the difference between an actual fluid pressure and a desired fluid pressure. The error signal operates a pair of solenoid valves which control the opening and closing of inlet and outlet ports between a source of high pressure and a low pressure reservoir to establish the desired pressure in a control chamber.

DETAILED DESCRIPTION OF THE INVENTION

Figure 1:
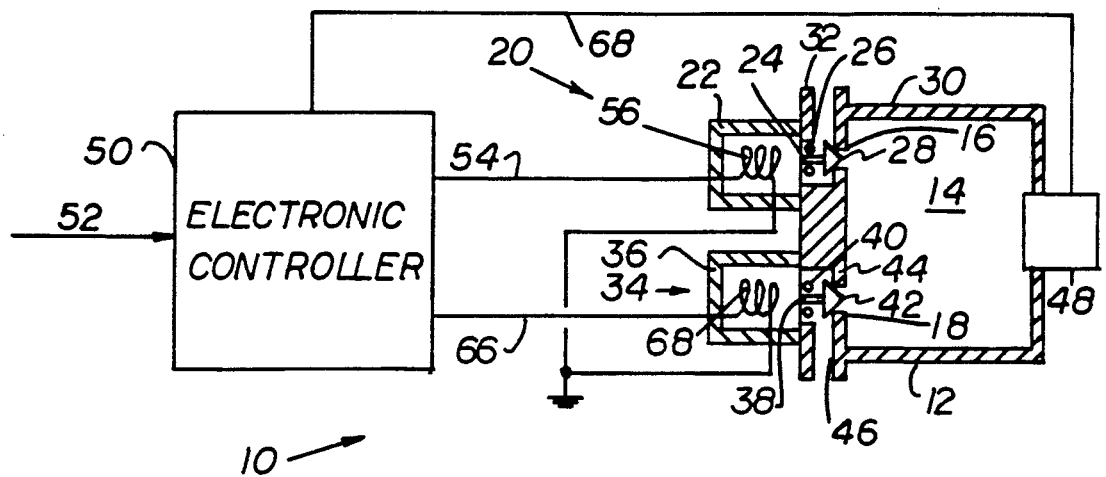
FIG. 1 is a schematic illustration of a doser system, for regulating the creation of a desired fluid pressure in a control chamber of a test stand made according to the principles of the invention.

The doser system 10 shown in FIG. 1 is designed to be used in a test stand, and in particular, a test stand associated with the calibration and testing of a fuel control for an engine used in an aircraft. Such a fuel control must be capable of operating under varying pressure conditions associated with changes in altitude and engine thrust. The test stand must simulate operating conditions as nearly as the same as experienced in flight and as a result changes in the fluid pressure in the test stand chambers must occur in a relatively short time period.

The doser system 10 shown in FIG. 1 includes a housing 12 with a control chamber 14 located therein. The control chamber 14 has an entrance port 16 and an exit port 18.

A first solenoid 20 has a housing 22 which is attached to the housing 12 of the control chamber 14 to align plunger 24 with respect to inlet port 16. A spring 26 acts on plunger 24 to urge face 30 against seat 28 to seal the inlet or entrance port 16 from passage 32 connected to a source of high pressure fluid.

A second solenoid 34 has a housing 36 which is attached to housing 12 of the control chamber 14 to align plunger 38 with the exit or outlet port 18. A spring 40 acts on plunger 38 to urge face 42 against seat 44 to seal the exit or outlet port 18 from passage 46 connected to a return reservoir or the surrounding atmosphere.

A pressure transducer 48, such as sold by Paroscientific Corporation, attached to housing 12 is connected to detect the actual fluid pressure Pc in the control chamber 14. The fluid pressure in the control chamber 14 is converted by the pressure transducer 48 into a feedback signal Pf and supplied to an electronic controller 50 on lead 68.

Figure 6:
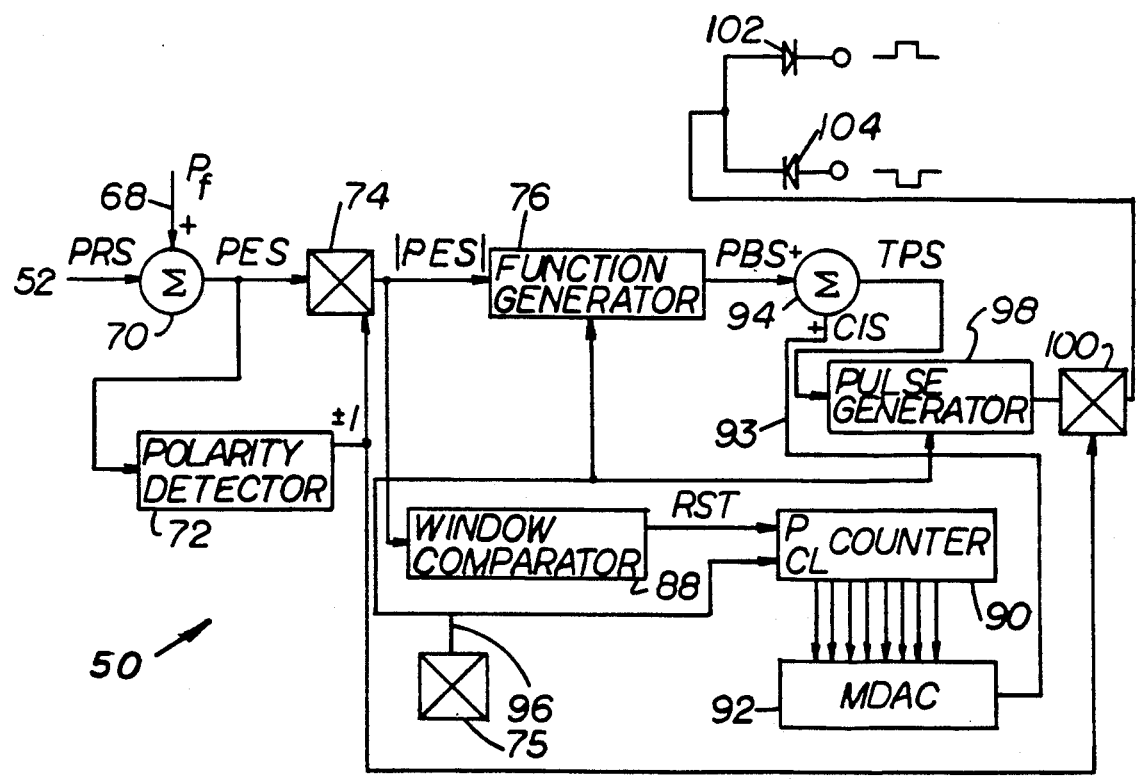
FIG. 6 is a schematic illustration of an electric circuit for developing actuation signals in the electronic controller for operating the solenoid valves which controls communication of pressure fluid in the control chamber of the doser system of FIG. 1.

A basic circuit illustrated in FIG. 6 which is located in the electronic controller 50 receives the feedback signal Pf from the pressure transducer 48 and evaluates the same with respect to an input signal supplied by an operator through lead 52. The input signal represents a desired fluid pressure Px for control chamber 14 at any particular time in the test procedure. When the input signal and the feedback signal are in equilibrium, the first and second solenoid valves are positioned as illustrated in FIG. 1.

The electronic controller 50 develops and supplies a pulse duration signal to either line 54 or 66 to control the on and off times of solenoids 20 and 34. These pulse modulations are developed or generated as a function of an error signal between the desired and the actual fluid pressure in chamber 14. The error signal is generated in a summing junction 70 as a difference between the input signal and the feedback signal. If the feedback signal is greater than the input signal, the error signal is positive and if the input signal is greater than the feedback signal, the error signal is negative. The error signal is communicated to a polarity detector 72 which generates a corresponding multiplicative factor of either $+1$ or $-1$. The error signal is also simultaneously communicated to a multiplication member 74 which receives an input from the polarity detector 72 and generates an error signal equal to the absolute value of the feedback signal regardless of its original polarity. This absolute error signal is communicated to a function generator 76 which generates a base pulse width signal from a schedule which is a function of the system error. The base pulse width signal is generated once every sampling period as a result of an input on lead 96 from clock 75.

The base pulse width signal is communicated to a summing junction 94 and combined with a correction signal on lead 93 to produce a total pulse width signal. The correction signal is the output from a counter 90 as a result of the signal on lead 96 from clock 75. Depending on the count in counter 90, a multiplying digital-to-analog converter 92 produces the correction signal to increase the base pulse width signal to the total pulse width value. The total pulse width signal is representative of the desired duration of the pulse width for a particular clock period. The total pulse width signal is communicated to a pulse generator 98 where a pulse width modulation occurs. The pulse generator 98 receives a timing signal from clock 75 from lead 96 to generate pulses with discrete timing intervals. The duration of the pulse from generator 98 is governed by the magnitude of the total pulse width signal.

The output pulses from the pulse generator 98 are transmitted to a multiplication circuit 100 which also receives an input from polarity detector 72. The multiplication circuit 100 multiplies the output pulses from generator 98 by either a $+1$ or $-1$ depending on whether the desired fluid pressure is higher or lower than the actual fluid press in chamber 14. The output from the multiplication circuit 10 is communicated to diodes 102 and 104 connected to leads 54 and 66, respectively. If the polarity of the error signal is positive, the output pulse from pulse generator is gated to solenoid 34 through diode 104 to supply coil 68 with electrical voltage sufficient to move plunger 38 such that fluid is allowed to flow from chamber 14. However, if the actual fluid pressure in chamber 14 is less than the desired fluid pressure then the polarity detector output will be a $-1$ and the pulse output from generator is gated to solenoid 20 voltage sufficient to move plunger 24 and allow fluid to flow from the source to chamber 14. The duration and timing of the output pulses from generator 98 is calculated to null the difference between the actual fluid pressure and the desired fluid pressure.

The counter 90 which counts every timing interval unless it is reset by a reset signal from a window comparator 88, resets the counter 90 for every sampling interval when the error signal is outside a set error band from a lower limit to a upper limit. Only when the error signal is within this band does the window comparator 88 permit the counter 90 to be activated on receipt of the signal from clock 75 and produce a correction signal. Small increments are added to the correction signal with succeeding pulses until the error signal is eliminated at which time the actual fluid pressure and desired fluid pressure are substantially identical in chamber 14.

Figure 2:
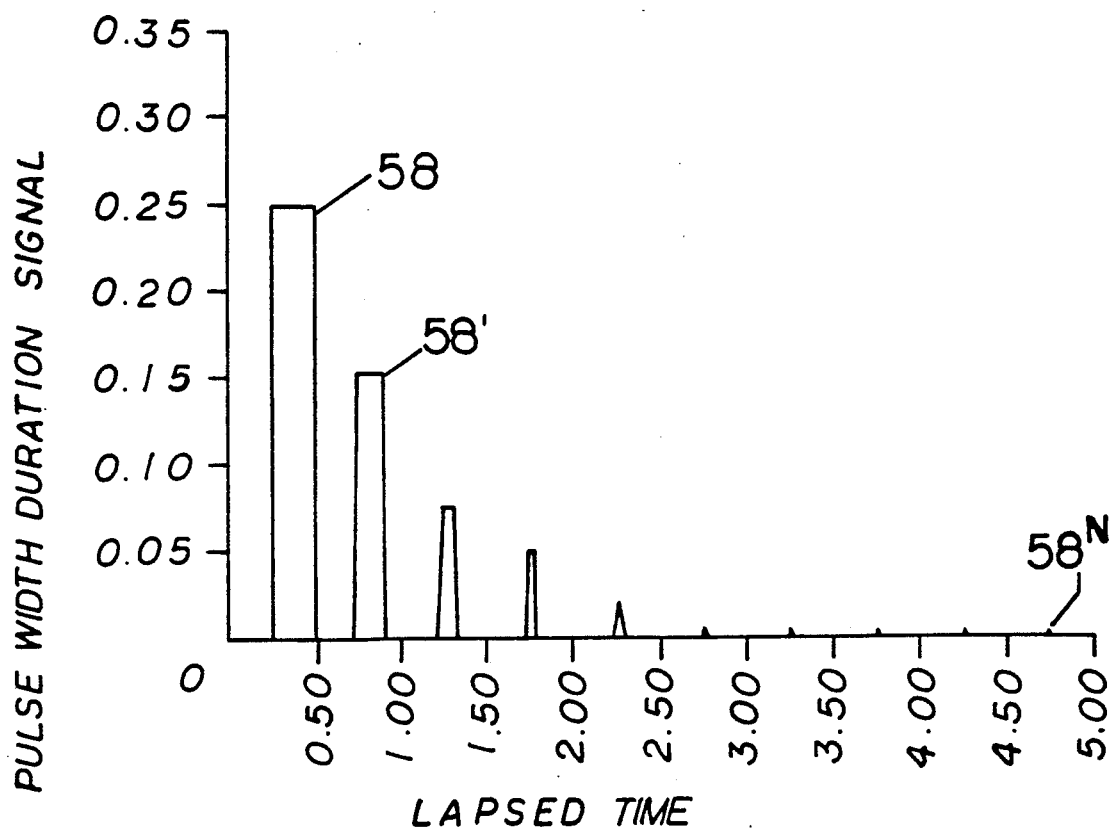
FIG. 2 is a graphic illustration of a typical actuation signal for a supply or first solenoid valve which controls communication of high pressure fluid to the control chamber in the doser system of FIG. 1.

In response to an input signal from an operator indicating that a higher fluid pressure Px is desired in control chamber 14, a pulse generator 98 in the electronic controller 50 establishes a negative actuation signal as a result of the error between the signal representative of fluid pressure Px and the actual fluid pressure Pc in control chamber 14. The negative actuation signal from controller 50 is supplied through lead 54 to actuate coil 56 in the first solenoid 20 and move face 30 on plunger 24 away from seat 28 to allow high pressure fluid to be communicated into control chamber 14 and change the fluid pressure Pc therein into Pc'. As shown in FIG. 2, the duration of the negative actuation signal as supplied by the pulse generator 98 is a series of pulses 58, 58'... $58^N$. of varying duration derived from the error signal developed in the controller 50 from Px-Pc'.

Figure 3:
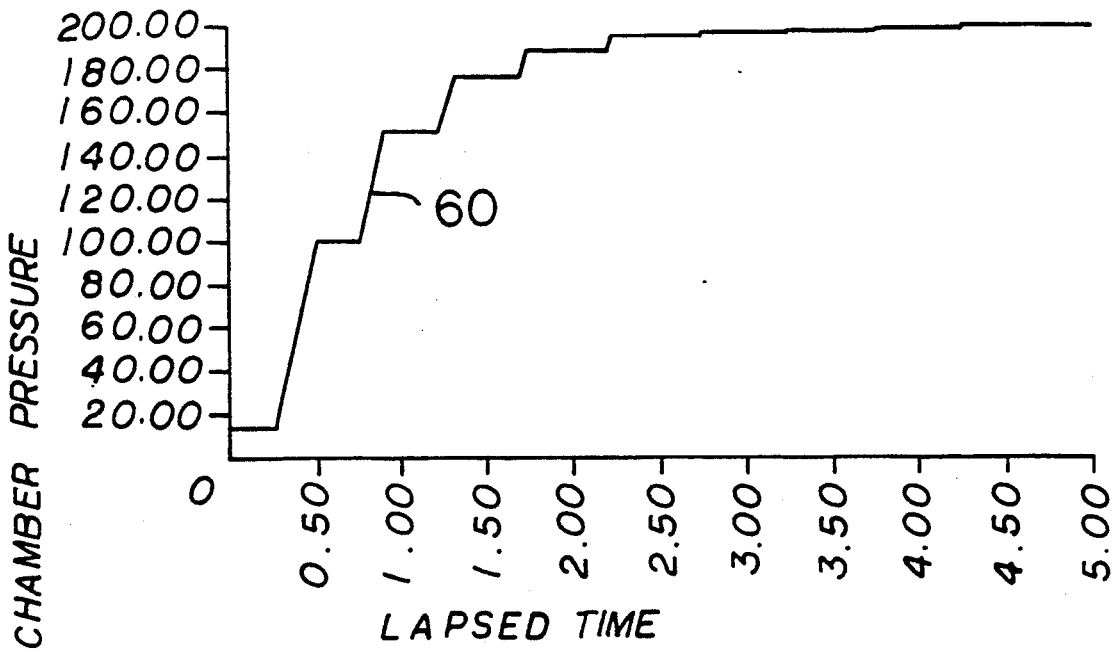
FIG. 3 is a graph illustrating the development of fluid pressure in the control chamber resulting from the actuation signal illustrated in FIG. 2.

FIG. 3 illustrates the change in fluid pressure in the control chamber 14 associated with the operation of the solenoid valve 20 as a result of the negative actuation signal. As can be seen in FIG. 3, the duration of the pulse width of the actuation signal for the solenoid valve 20 decreases as the fluid pressure Pc' approaches Px. In an actual test, wherein the available supply fluid pressure available in passage 32 from the source was 300 psi and the desired fluid pressure Px in the control chamber was 200 psi, the fluid pressure Pc in the control chamber was incrementally increased in a manner illustrated by curve 60 in FIG. 3 to the desired fluid pressure Px as a result of the series of actuation pulses as illustrated in FIG. 2. The desired fluid pressure Px' was established within +or −0.3 psi the control chamber 14 within 4.75 seconds. This accuracy and time period is considered acceptable for this test stand operation.

Figure 4:
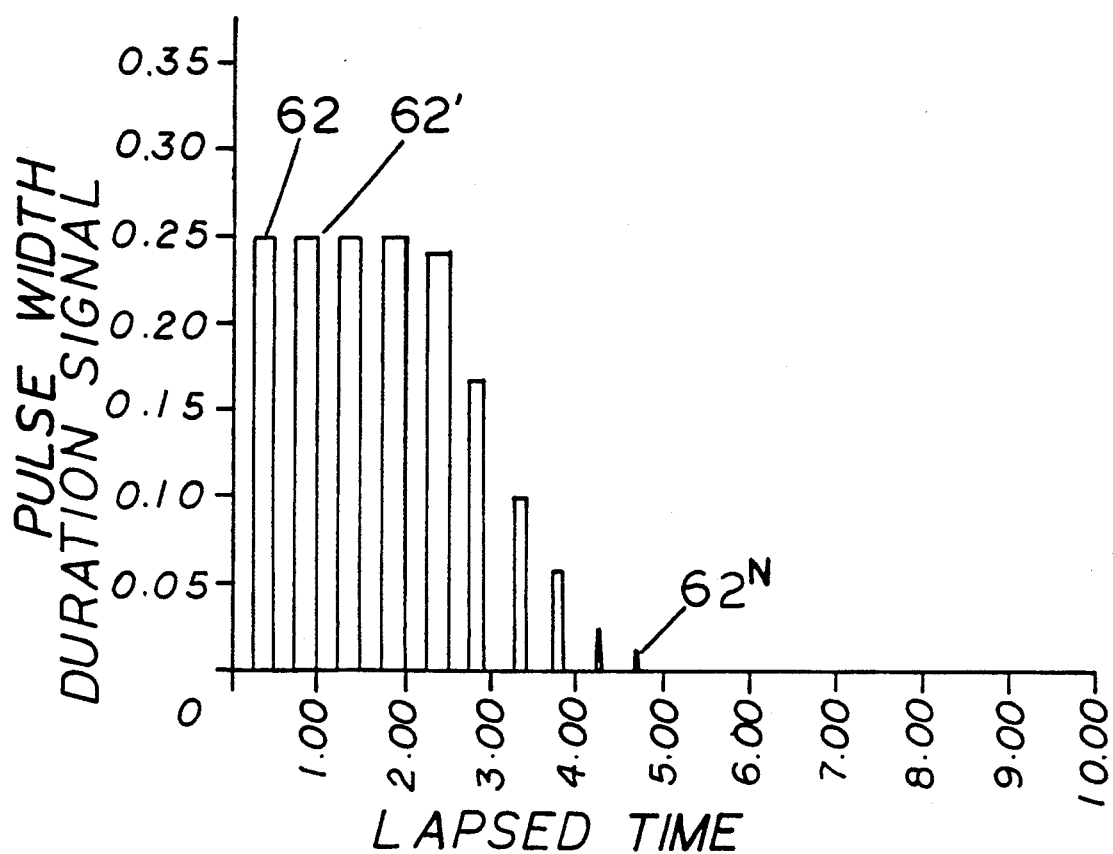
FIG. 4 is a graphic illustration of a typical actuation signal for the return or second solenoid valve which controls communication of fluid pressure from the control chamber in the doser system of FIG. 1.

When the fluid pressure Pc in the control chamber 14 is greater than the desired fluid pressure Px, the operation of the doser system 10 is as follows. The error signal as created by the difference between Px and Pc is represented as a positive actuation signal. The positive actuation signal is supplied from pulse generator 98 by lead 66 to the second solenoid valve 34 as a series of electrical pulses 62, 62''. . . 62$^N$ as illustrated in FIG. 4 to provide an electrical input to actuate coil 68. Actuation of coil 68 causes plunger 38 to move and allow fluid in chamber 14 to flow past seat 44 and face 42 into passage 46 connected to a return reservoir or the surrounding environment. With each actuation of solenoid valve 34, the fluid pressure in control chamber 14 decreases in a manner as illustrated by curve 64 in FIG. 5. Since the duration of the pulse width of each actuation signal is controlled by the positive error signal derived by the difference in the desired signal Px and Pc' as the desired fluid pressure is approached, the pulse width correspondingly decreases.

Figure 5:
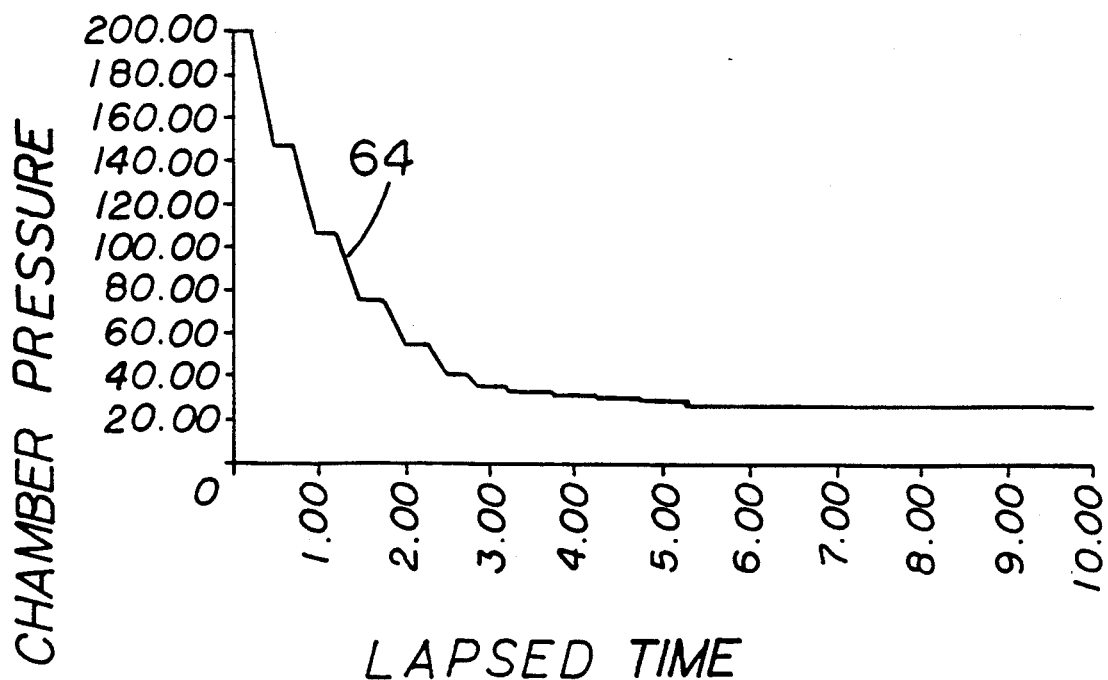
FIG. 5 is a graphic illustration of the fluid pressure development in the control chamber resulting from the actuation signal illustrated in FIG. 4.

A test was performed to evaluate the doser system 10 wherein the fluid pressure Pc in the control chamber 14 was reduced from 200 psi to 25 psi. The fluid pressure change in control chamber 14 for the test is illustrated in FIGS. 4 and 5. The actual measured fluid pressure in chamber 14 of 25.03 psi was achieved in 5.75 seconds which is within the operational parameters for a test stand.

The doser system 10 is highly accurate and provides an immediate response to establish a desired fluid pressure in a chamber 14 to simulate an operational parameter in a fuel control. This doser system 10, was tested with pressurized air as the source of high pressure fluid since the fuel control was evaluated to simulate an aircraft in flight. However, it is anticipated that hydraulic fluid could also be made to operate in an acceptable manner using the same principles set forth herein.

We claim:

1. In a test stand having a normally sealed control chamber having a fluid pressure (Pc) therein for simulating an operational parameter for a device, a doser system for establishing a desired pressure (Px) within said control chamber, said doser system comprising:

a first housing having a first inlet port connected to a source of high pressure fluid (Ps) and a first outlet port connected to said control chamber, said first housing having a first surrounding said first outlet port;

a second housing having a second inlet port connected to said control chamber and a second outlet port connected to the surrounding environment having a third pressure ($P_r$), said second housing having a second seat surrounding said second inlet port;

a first solenoid valve located in said first housing and having a first plunger with a first face urged toward said first seat;

a second solenoid valve located in said second housing and having a second plunger with a second face urged toward said second seat;

a pressure transducer connected to said control chamber for developing a feedback signal indicative of the fluid pressure (Pc); and control means connected to receive an input signal from an operator corresponding to said desired pressure (Px) and connected to said pressure transducer to receiver said feedback signal, said control means responding to said input signal by supplying one of said first and second solenoid valves with an error signal derived from the difference between (Px) and (Pc), said error signal moving either said first face away from said first seat to allow high pressure fluid (Ps) to be communicated to said control chamber or said second face away from said second seat to allow fluid to flow from said control chamber through said outlet port to establish a current fluid pressure (Pc') in said control chamber, said control means continuing to supply an error signal to one of said first and second solenoid valves until (Pc') is equal to (Px), said error signal being a series of fixed frequency pulses which logarithmically vary in duration as (Pc') approaches (Px), each pulse in said series of pulses being incrementally less in duration than the preceding pulse, said pulse supplied to said first or second solenoid valves being of such duration that the effect of each valve movement is reflected in a difference between (Px) and (Pc) before the next pulse is computed to thereby assure continuous brief movement of the selected first or second valves until the error signal is reduced to a desired level and Px is equal to Pc.

* * * * *